United States Patent
Dobbin et al.

(10) Patent No.: US 8,894,338 B2
(45) Date of Patent: Nov. 25, 2014

(54) FLANGED CAP FOR FORMING SEALED CAVITY AROUND FASTENER

(71) Applicant: Airbus Operations Limited, Bristol (GB)

(72) Inventors: Richard Dobbin, Chepstow (GB); Anthony Dowson, Lydney (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 13/967,224

(22) Filed: Aug. 14, 2013

(65) Prior Publication Data

US 2014/0048198 A1     Feb. 20, 2014

(30) Foreign Application Priority Data

Aug. 15, 2012   (GB) .................................. 1214579.3

(51) Int. Cl.

| | |
|---|---|
| F16B 3/00 | (2006.01) |
| B64D 45/02 | (2006.01) |
| F16B 37/14 | (2006.01) |
| F16B 39/22 | (2006.01) |

(52) U.S. Cl.
CPC .............. *F16B 39/225* (2013.01); *B64D 45/02* (2013.01); *F16B 37/14* (2013.01)
USPC .......................................... 411/373; 411/369

(58) Field of Classification Search
USPC ........... 411/369, 371.1, 372.5, 373, 375, 383, 411/429, 430, 431, 432
See application file for complete search history.

(56) References Cited

U.S. PATENT DOCUMENTS

| | | | | | |
|---|---|---|---|---|---|
| 3,557,654 | A | * | 1/1971 | Weidner, Jr. ................... | 411/396 |
| 3,618,444 | A | * | 11/1971 | Kay et al. ........................ | 411/373 |
| 3,881,391 | A | * | 5/1975 | Dereszynski ................. | 411/368 |
| 4,373,842 | A | * | 2/1983 | Bettini et al. .................. | 411/377 |
| 4,400,123 | A | * | 8/1983 | Dunegan ........................ | 411/373 |
| 4,472,097 | A | * | 9/1984 | Kiefer et al. ................... | 411/369 |
| 5,338,141 | A | * | 8/1994 | Hulsey ........................... | 411/375 |
| 5,393,182 | A | * | 2/1995 | Berecz ........................... | 411/369 |
| 6,074,148 | A | * | 6/2000 | Wilson .......................... | 411/430 |
| 6,244,807 | B1 | * | 6/2001 | Garcia ........................... | 411/369 |
| 2004/0126202 | A1 | * | 7/2004 | Somers et al. ................. | 411/429 |

FOREIGN PATENT DOCUMENTS

| | | |
|---|---|---|
| DE | 4439567 A1 | 6/1995 |
| EP | 2154495 A1 | 2/2010 |
| WO | 2012107741 A1 | 8/2012 |

OTHER PUBLICATIONS

Search Report for Application No. GB1214579.3, dated Dec. 3, 2012.

* cited by examiner

*Primary Examiner* — Roberta Delisle
(74) *Attorney, Agent, or Firm* — Lowe Hauptman & Ham, LLP

(57) ABSTRACT

A cap has a body portion forming a central cavity, and an annular flange which extends outwardly from the body portion. The body portion is deformable between a first configuration in which the annular flange is inclined upwardly, and a second configuration in which the annular flange is inclined downwardly. A method includes applying a quantity of sealant to the annular flange in the first configuration; fitting the cap over the end of the fastener so that the fastener is enclosed by the cap; and turning down the annular flange such that the cap assumes the second configuration in which an annular pocket is formed between the flange and the base, and the sealant material fills the annular pocket; and bonding the cap to the structure with the sealant material.

19 Claims, 3 Drawing Sheets

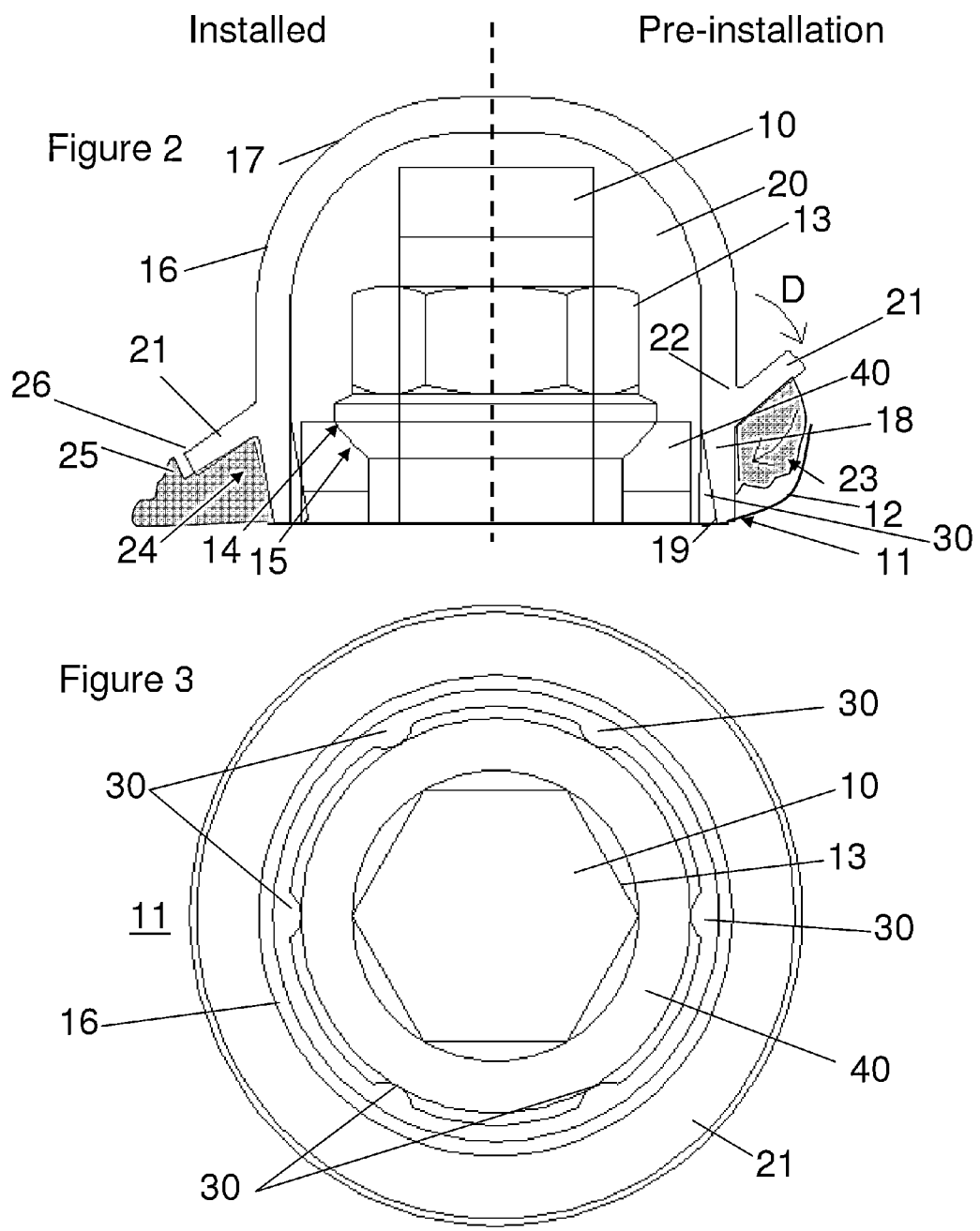

FLANGED CAP FOR FORMING SEALED CAVITY AROUND FASTENER

RELATED APPLICATIONS

The present application is based on, and claims priority from, British Application Number 1214579.3, filed Aug. 15, 2012, the disclosure of which is hereby incorporated by reference herein in its entirety.

FIELD OF THE INVENTION

The present invention relates to a cap for forming a sealed cavity around an end of a fastener, a method of installing such a cap, and a joint comprising such a cap.

BACKGROUND OF THE INVENTION

FIG. 1 is a side view of part of a fastener assembly passing through a composite panel 1. The assembly comprises an externally threaded bolt 2, an internally threaded nut 3, and a washer 4. In the event of a lightning strike hitting the composite panel 1 and attaching to the fastener, sparking, plasma or out-gassing may occur at the locations 5 shown in FIG. 1.

A known method of providing spark suppression is described in EP-A-0334011. A volume of gas is enclosed by a cap around the fastener. The gas provides spark suppression for arcing that may occur between the composite structure and the metal fastener during any lightning strike.

SUMMARY OF THE INVENTION

A first aspect of the invention provides a cap for forming a sealed cavity around an end of a fastener, the cap comprising a body portion with a base terminating at an edge which surrounds an opening into a central cavity, and an annular flange which extends outwardly from the body portion at a point which is set back from the edge of the base, wherein the body portion is deformable between a first configuration in which at least a part of the annular flange is inclined upwardly away from the base, and a second configuration in which said part of the annular flange is inclined downwardly at an acute angle to the base so as to define an annular pocket between the flange and the base.

The first configuration preferably corresponds to a pre-installed condition, and the second configuration corresponds to an installed condition in which the cap forms a sealed cavity around an end of a fastener. The first configuration may be an "as moulded state" of the cap, which is deformed to the second configuration during installation. Alternatively, the cap may be deformed from its "as moulded" state to assume the first configuration prior to installation, and subsequently deformed a second time back to its "as moulded" state to assume the second configuration during installation.

A second aspect of the invention provides a joint comprising: a structure; a fastener passing through the structure; a cap comprising a body portion with a base terminating at an edge, the body portion forming an enclosure around an end of the fastener, and an annular flange which extends outwardly from the body portion and is set back from the edge of the base, wherein the body portion is in a deformed state in which at least a part of the annular flange is inclined downwardly at an acute angle to the base so as to define an annular pocket between the flange and the base, deformed from a pre-installed state in which said part of the annular flange is inclined upwardly away from the base; and a sealant material in the annular pocket between the flange and the base, the sealant material bonding the cap to the structure.

A third aspect of the invention provides a method of installing a cap to form a sealed cavity around an end of a fastener, the fastener passing through a structure, the cap comprising a body portion with a base terminating at an edge which surrounds an opening into a central cavity, and an annular flange which extends outwardly from the body portion at a point which is set back from the edge of the base, wherein the body portion is deformable between a first configuration in which at least a part of the annular flange is inclined upwardly away from the base, and a second configuration in which said part of the annular flange is inclined downwardly at an acute angle to the base, the method comprising: applying a quantity of sealant to the annular flange of the cap when the cap is in the first configuration; fitting the cap over the end of the fastener so that the fastener is enclosed by the cap; turning down the annular flange such that the cap assumes the second configuration in which an annular pocket is formed between the flange and the base, and the sealant material fills the annular pocket; and bonding the cap to the structure with the sealant material.

Advantageously, the cap comprises an elastically deformable material. In the event of a lightning strike hitting the structure and attaching to the fastener causing sparking, plasma or out-gassing, the shock loads imparted to the cap can be significant. More rigid caps have a tendency to disbond from the structure, whereas the deformable cap material is able to accommodate such shock loads even at high energy levels. The cap material is preferably a cured sealant material, such as polysulphide, or an elastomeric material, such as rubber.

The cap is preferably a unitary component, and may be formed by moulding.

The invertable flange provides a dual purpose. In its pre-installed state the flange can accommodate a metered quantity of the sealant material prior to installation. Once the flange has been inverted to its installed state the flange urges the sealant material to form a continuous bead around the base of the cap. The bead of sealant material can be substantially void free and this mode of application is highly repeatable and accurate, without requiring a high skill level. Secondly, inverting the flange deforms the base of the cap such that it grips around the fastener. The cap can therefore be installed onto inverted fasteners in a downward facing structural surface without risk of falling off under the action of gravity.

The sealant material performs two functions: firstly it bonds the cap to the structure, and secondly it forms a seal between the cap and the structure so as to prevent gas from escaping the enclosure and/or prevent the ingress of a liquid (such as fuel) into the enclosure. Typically the sealant material is cured in-situ to bond the cap to the structure.

The sealant material may be a material such as a two-part epoxy which is normally used in applications where its primary (or sole) purpose is to act as an adhesive. Alternatively the sealant material may be a material such as polysulphide or silicone rubber which is normally used in applications where its primary (or sole) purpose is to act as a sealant. In the latter case the sealant material is typically an elastomer. The epoxy sealant/adhesive provides an advantage in that the bond between the cap and the structure performs particularly well at resisting lateral out-gassing during a lightning strike. The polysulphide sealant provides an advantage when used with a cured polysulphide cap in that the material match promotes bond strength.

The angle of the flange, in its installed state, enables it to have a relatively small footprint, compared to a flange which extends at 90° to the base. The angle of the flange also increases the surface area of the interface between the sealant material and the cap, compared to a flange with an equivalent footprint which extends at 90° to the base.

The annular flange may have an edge which is set back from a plane defined by the edge of the base, when in the installed state. This may assist with avoiding interference with any surface features on the structure near the cap. The edge of the flange may engage the surface of the structure, or may form a gap with the surface that is filled with the sealant.

The annular flange may be substantially frustoconical. The flange may be substantially linear in cross section, or may be curved. If curved, the flange may be concave or convex as viewed from the base of the cap when in the pre-installed state, and the flange may retain the same curvature or may switch from convex to concave or vice versa during transition to the installed state.

The body portion preferably has two naturally stable shapes corresponding to the first configuration (pre-installed state) and to the second configuration (installed state), respectively. During transition from the pre-installed state to the installed state the body portion may be arranged to 'flip' or 'kink' or 'snap' as the flange moves from one stable state to the other. The elastically deformable nature of the cap material promotes these two stable states. The flipping may be effected manually, e.g. by human hand(s) running around the flange, or by mechanical means.

Preferably the cap has a curved domed shape. This reduces exposure to damage (for instance by being kicked by the foot of a service engineer) and minimises stress concentration. A flattened top of the dome shape is preferable, though not essential, as it enables the cap to be placed inverted (base upwardly) upon a work surface, for example. This may facilitate application of the sealant material to the flange prior to installation.

The body portion may include a plurality of ribs arranged facing inwardly into the central cavity. The ribs may be disposed on an inside wall at the base of the body portion. The ribs each act as a single point of contact to grip the fastener when the body portion is in the installed state. Advantageously, a space between adjacent ribs provide an air gap. In the event of a lightning strike, the air gap provides a substantially unimpeded path for any out-gas to pass from the fastener into the cavity within the cap. This reduces the risk of a lateral out-gassing event under the bond line over the structure surface. The number of ribs is variable, and may be a compromise between ensuring effective gripping to the fastener and providing sufficient free space for out-gas to pass into the cavity.

The enclosure is preferably free from any sealant material which bonds the cap to the structure. It has been found that sealant material between the fastener and the inside of the base of the cap prevents out-gas from passing from the fastener into the cavity in the event of a lightning strike, which promotes undesirable lateral out-gassing and disbonding of the cap from the structure.

The structure typically comprises a pair of structural parts (for instance panels) which are joined together by the fastener.

The fastener may comprise a shaft with a head at one end; and a collar fitted to a second end of the shaft (the collar may for instance be a nut which is screwed onto the shaft, or a collar which is swaged onto the shaft). The cap may be used to form a sealed cavity at either the first or second end of such a fastener. The end of the fastener may be housed within the central cavity, or it may be countersunk within the structure (in which case the end of the fastener will lie outside the central cavity).

The fastener may comprise a shaft; a collar attached to the shaft; and a washer between the collar and the structure, wherein the washer and collar have spherical surfaces which engage each other. The cap may engage the washer but not the collar. Alternatively, the cap can engage with the collar and have flexibility to seat onto the surface of the structure. The spherical surface enables the shaft to pass through the structure at an oblique angle. Typically the washer is received within the central cavity as an interference fit.

BRIEF DESCRIPTION OF THE DRAWINGS

Embodiments of the invention will now be described with reference to the accompanying drawings, in which:

FIG. 2 is a cross-sectional side view of a fastener assembly and spark containment cap having a flange during installation according to an embodiment of the invention;

FIG. 3 is a cross-sectional plan view of the fastener assembly and cap of FIG. 2.

DETAILED DESCRIPTION OF EMBODIMENT(S)

Figure 1:
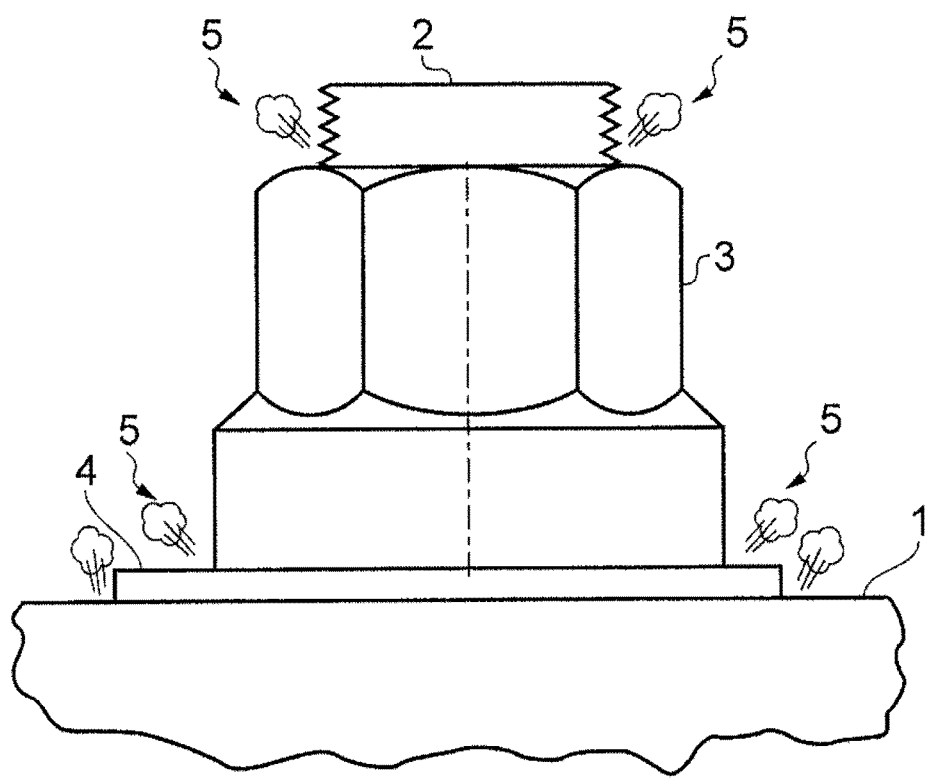
FIG. 1 is a side view of a nut and bolt assembly.

FIG. 2 is a cross-sectional side view showing a metal bolt 10 passing through a composite panel 11. The bolt 10 may be inclined with respect to the plane of the panel 11. The panel has a raised feature 12 on one side, which may be for example fillets, ribs or spar caps. An internally threaded metal nut 13 is screwed onto the bolt 10 and has a convex spherical surface 14 which engages a concave spherical surface 15 of a washer 40. The spherical nut and washer enable the fastener to be securely fixed to the panel even though the bolt may not be perpendicular to the panel.

A spark containment cap 16 is fitted over the fastener. The cap has a unitary, single part construction. The cap 16 has a domed shaped upper part as indicated at 17 which reduces exposure to damage (for instance by being kicked by the foot of an installer) and minimises stress concentration.

The cap 16 is formed from a deformable material, and in this embodiment comprises a moulded cured sealant material. The sealant material is a polysulphide sealant. The polysulphide sealant is an aerospace grade such as PR-1776M B-2 or MC 238 B-2, for example. Alternatively, the cap material may be an elastomer, such as a silicone rubber for example.

The shape of the cap is formed by moulding. In FIG. 2, the right hand side illustrates a pre-installed configuration of the cap, whereas the left hand side illustrates an installed configuration of the cap. In the pre-installed configuration the cap may be in an "as moulded" state. The cap may then be deformed to its installed configuration during installation. Alternatively, the cap may be deformed from its "as moulded" state during manufacture to assume the pre-installed configuration. During installation the cap may then be deformed a second time back to its "as moulded" state to assume the installed configuration. It may be preferable that the cap assumes its "as moulded" state when installed as the pre-load and tolerances may be more tightly controllable.

In the pre-installed state the cap 16 has a substantially circular cylindrical base 18 terminating at an edge 19 which surrounds an opening into a central cavity 20. The edge 19 provides a clearance fit to leave a gap with the washer 40 during installation prior to deforming the cap. The central cavity accommodates the nut 13, bolt 10 and washer 40.

A frustoconical annular flange 21 extends outwardly from the base of the cap 16. In the pre-installed state the flange 21 is inclined upwardly away from the base 18 and forms an obtuse angle of approximately 120° to 140° with respect to the axis of rotation of the cylindrical base 18 in the direction away from the edge 19. The point 22 where the flange 21 begins to extend outwardly from the cap 16 is set back from the edge 19 of the base 18, i.e. is above the edge of the base in the direction of the axis of rotation of the cylindrical base.

As shown in the cross section plan view of FIG. 3 the interior wall of the base 18 (facing into the cavity 20) has a plurality of ribs 30. The ribs 30 are regularly spaced around the interior wall of the base and are tapered from a most prominent projection near the edge 19 to fully blend into the cylindrical base by point 22. In this particular example six ribs are shown but there may be a fewer or greater number of these ribs as desired.

In the pre-installed state the underside of the flange 21, i.e. the side of the flange facing downwardly, forms together with the outer surface of the base 19 a groove that can accommodate a metered quantity of sealant material 23. The sealant material may be either a polysulphide sealant such as that used for the cap, or may be an epoxy adhesive such as Scotch-Weld™ 7256 B/A by 3M Corp. (two-part epoxy structural adhesive) or 9323-2 B/A structural adhesive (epoxy based two part adhesive), for example.

The sealant material 23 is applied continuously around cap. The sealant material 23 is applied using an automated dispenser with three axis (x, y, z) control, although it may alternatively be applied manually. The sealant may be applied with the cap 16 in an inverted state with the base 18 uppermost. Alternatively, the sealant may be applied with the cap in any orientation, depending on the flowability of the sealant material. The sealant material can be applied in a fresh or frozen state.

The cap 16 with the sealant material 23 applied is fitted over the nut 13, bolt 10 and washer 40, which are accommodated by the central cavity 20 of the cap as shown on the right hand side in FIG. 2. The edge 19 of the base 18 rests against the surface of the panel 11.

Next, the cap 16 is changed (deformed) from its pre-installed state to its installed state by forcing the flange 21 downwardly in the direction of arrows D. The frustoconical flange 21 moves from a stable upwardly inclined position to a stable downwardly inclined position as shown on the left hand side of FIG. 2. The flange 21 may flip or kink or snap as it moves between its stable states. This transformation may be effected by mechanical pressure applied to the flange or by a human hand, e.g. running fingers around the flange 21.

In the deformed state the flange 21 of the cap is inclined downwardly and forms an acute angle of approximately 40° to 60° with respect to the axis of rotation of the base 18 in the direction away from the edge 19. The base 18 also deforms from the substantially circular cylindrical shape to a non-circular shape with a plurality of lobes (as viewed in plan).

The deformation of the cap 16 serves two purposes. Firstly, the downwardly inclined flange 21 forms an annular sealant pocket 24 between the flange 21 and the base 18. The pocket 24 is filled with the sealant 23 applied prior to installation, and an excess of sealant flows out from under the flange 21 over the surface of the panel 11 and creates a lip 25 at the edge 26 of the flange. Next as shown in FIG. 10 the outer cap 20 is pushed onto the inner cap 16. Importantly, the sealant 23 does not enter the central cavity 20.

The sealant 23 in the sealant pocket 24 bonds the cap 16 to the panel 11 and the sealed cavity 20 contains any sparking, plasma or out-gassing caused by a lightning strike. The cap may be immersed in fuel, in which case the sealant also prevents the ingress of fuel into the cavity 20.

The edge 26 of the flange 21 in the deformed state is set back above the surface of the panel, creating a relatively large pocket 24. This accommodates undulations or surface features on the panel 11. The sealant pocket 24 increases the adhesion area for the sealant/cap interface. Specifically, the sealant bonds the cap to the composite panel 11 via an adhesive/cap interface with the cap and an adhesive/panel interface with the composite panel. The surface area of the adhesive/cap interface is given by the sum of the areas of the outside of the base 18 and the underside of the flange 21; and the surface area of the adhesive/panel interface is given by the surface area of the sealant in contact with the panel. The surface area of the adhesive/cap interface will typically be greater than the surface area of the adhesive/composite interface.

A second function of flipping down the flange 21 to the deformed state is to urge the ribs 30 to grip the washer 40. This creates an interference fit which prevents the cap from falling off under the action of gravity if the panel 11 is downward facing. The ribs 30 also act as spacers producing an air gap around the washer 40 where out gassing may emanate.

Figure 4A:
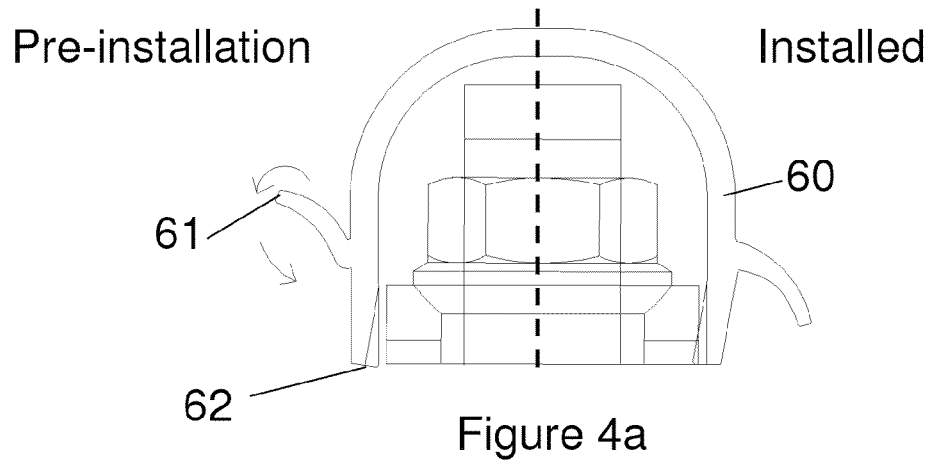
FIGS. 4a-c illustrate various alternative flange shapes for the cap.
Figure 4B:
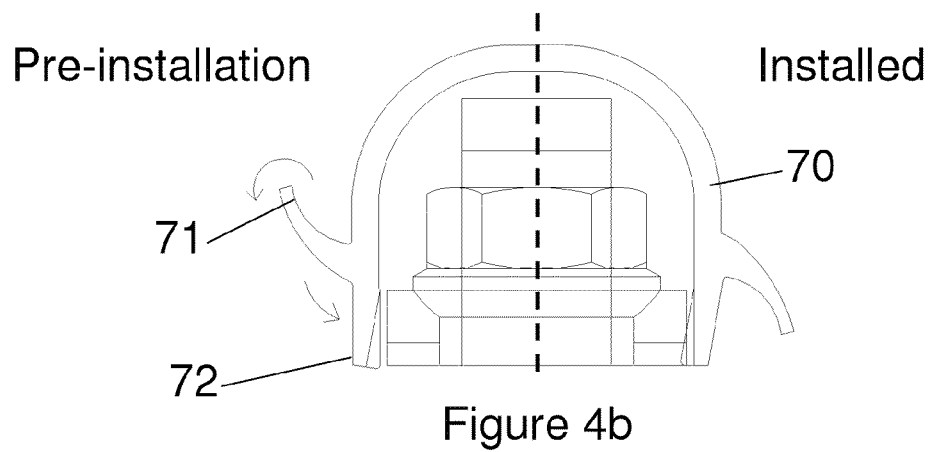
Figure 4C:
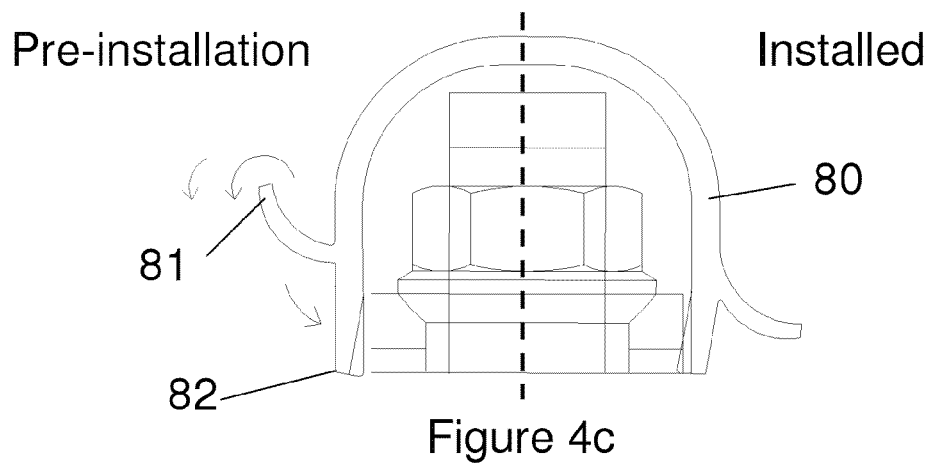

FIGS. 4a-c illustrate variants of the cap with different flange designs. Each variant is shown in its pre-installed state on the left hand side, and in its installed state on the right hand side. All other features of the cap, the sealant, the fastener and the joint are identical to that described previously and so will not be repeated here. In all variants the flange has a curved cross-section, rather than the straight cross section shown in FIG. 2.

FIG. 4a shows a first variant in which the cap 60 has a flange 61 with a concave curvature as viewed from the base 62 of the cap. The flange 61 is inclined upwardly away from the base in its pre-installed state, and is inclined downwardly so as to form an acute angle with the base at the intersection when in the installed state.

FIG. 4b shows a second variant in which the cap 70 has a flange 71. The flange 71 has a convex curvature as viewed from the base 72 of the cap and is inclined upwardly away from the base in its pre-installed state. The flange 71 has a concave curvature as viewed from the base 72 of the cap and is inclined downwardly so as to form an acute angle with the base at the intersection when in the installed state.

FIG. 4c shows a second variant in which the cap 80 has a flange 81. The flange 81 has a convex curvature as viewed from the base 72 of the cap and is inclined upwardly away from the base in its pre-installed state. The flange 71 has a convex curvature as viewed from the base 72 of the cap and is inclined downwardly so as to form an acute angle with the base at the intersection when in the installed state.

Although the invention has been described above with reference to one or more preferred embodiments, it will be appreciated that various changes or modifications may be made without departing from the scope of the invention as defined in the appended claims.

The invention claimed is:

1. A cap for forming a sealed cavity around an end of a fastener, the cap comprising a body portion with a base terminating at an edge which surrounds an opening into a central cavity, and an annular flange which extends in a direction outwardly from the body portion at a point which is set back from the edge of the base, wherein the body portion is deformable between a first configuration in which at least a part of the annular flange is inclined upwardly away from the base in said outward direction, and a second configuration in which said part of the annular flange is inclined downwardly at an acute angle to the base in said outward direction so as to define an annular pocket between the flange and the base.

2. A cap according to claim 1, wherein the annular flange has an edge which is set back from the edge of the base, when in the second configuration.

3. A cap according to claim 1, wherein the annular flange is substantially frustoconical.

4. A cap according to claim 1, wherein the body portion has two naturally stable shapes corresponding to the first configuration and to the second configuration, respectively.

5. A cap according to claim 1, wherein the body portion further comprises a plurality of ribs arranged facing inwardly into the central cavity.

6. A cap according to claim 5, wherein the ribs are disposed on an inside wall at the base of the body portion.

7. A cap according to claim 1, wherein the body portion further comprises an upper part having a dome shape, preferably with a flattened central portion.

8. A cap according to claim 1, wherein the first configuration corresponds to a pre-installed condition, and the second configuration corresponds to an installed condition in which the cap forms a sealed cavity around an end of a fastener.

9. A cap according to claim 1, wherein the cap is a unitary component, preferably a moulded component.

10. A cap according to claim 1, wherein the cap comprises a cured sealant material or an elastomeric material.

11. A joint comprising:
 a. a structure
 b. a fastener passing through the structure;
 c. a cap according to claim 1, wherein the body portion forms an enclosure around an end of the fastener, and wherein the body portion is in a deformed state corresponding to the second configuration of the body portion; and
 d. a sealant material in the annular pocket between the flange and the base, the sealant material bonding the cap to the structure.

12. A joint according to claim 11, wherein the sealant material bonds the cap to the structure via a sealant/cap interface with the cap, and via a sealant/structure interface with the structure.

13. A joint according to claim 11, wherein the enclosure provides an air filled cavity around the end of the fastener.

14. A joint according to claim 11, wherein the enclosure is free from the sealant material which bonds the cap to the structure.

15. A joint according to claim 11, wherein the cap further comprises a plurality of ribs which grip the fastener.

16. A joint according to claim 15, wherein a space between adjacent ribs defines an air gap between the fastener and the base of the cap.

17. A joint according to claim 11, wherein the fastener comprises a shaft; a collar attached to the shaft; and a washer between the collar and the structure, wherein the washer and collar have spherical surfaces which engage each other, and wherein the cap engages the washer but not the collar.

18. A method of installing a cap according to claim 1 so as to form a sealed cavity around an end of a fastener, the fastener passing through a structure, the method comprising:
 a. applying a quantity of sealant to the annular flange of the cap when the cap is in the first configuration;
 b. fitting the cap over the end of the fastener so that the fastener is enclosed by the cap;
 c. turning down the annular flange such that the cap assumes the second configuration in which an annular pocket is formed between the flange and the base, and the sealant material fills the annular pocket; and
 d. bonding the cap to the structure with the sealant material.

19. A method according to claim 18, wherein the cap further comprises a plurality of internal ribs, and the step of turning down the flange deforms the base of the cap and forces the ribs to grip the fastener.

* * * * *